United States Patent [19]

Chargo et al.

[11] Patent Number: 4,674,219
[45] Date of Patent: Jun. 23, 1987

[54] WATERFOWL DECOY

[76] Inventors: Peter Chargo; Todd M. Chargo, both of 5171 Field Rd., Clio, Mich. 48420

[21] Appl. No.: 855,338

[22] Filed: Apr. 24, 1986

[51] Int. Cl.$^4$ ............................................ A01M 31/06
[52] U.S. Cl. ......................................................... 43/3
[58] Field of Search ...................... 43/3, 2; 441/23, 24, 441/25, 26

[56] References Cited

U.S. PATENT DOCUMENTS

| | | | |
|---|---|---|---|
| 811,036 | 1/1906 | Cram | 43/3 |
| 1,789,649 | 1/1931 | Gazecki et al. | 43/3 |
| 1,951,429 | 3/1934 | Massie | 43/3 |
| 2,747,814 | 5/1956 | Taylor | 43/3 |
| 3,079,719 | 3/1963 | Muszynski | 43/3 |
| 4,340,192 | 7/1982 | Burris, III | 43/3 |

Primary Examiner—Nicholas P. Godici
Assistant Examiner—Karen Skillman
Attorney, Agent, or Firm—Krass & Young

[57] ABSTRACT

A waterfowl decoy assembly in which a reel is positioned in a downwardly opening cavity in the forward end of the body of the decoy and an anchor line is wound around a central hollow hub of the reel. A strip of spring steel is positioned in wound condition within the hub member with the inner end of the strip secured to a fixed axle on which the reel is rotatably mounted and the outer end of the strip fixed adjacent the inner periphery of the hub member. The parameters of the strip of spring steel are chosen such that, with the anchor line tensioned by the weight of the anchor, the steel strip functions to controllably resist the unwinding movement of the reel to allow the anchor to seek the bottom of the associated body of water, whereafter the spring steel strip functions to preclude any further paying out of line and to tension the payed out line so that the decoy remains directly over the anchor. When the decoy is removed from the water and the weight of the anchor is disassociated from the line, the spring steel strip functions to move the reel in a winding direction to quickly wind the line into a stowed position on the reel. Also disclosed is an anchoring mechanism for aftermarket use which may be readily attached to existing decoys and which provides the same functioning as the invention decoy assembly.

12 Claims, 7 Drawing Figures

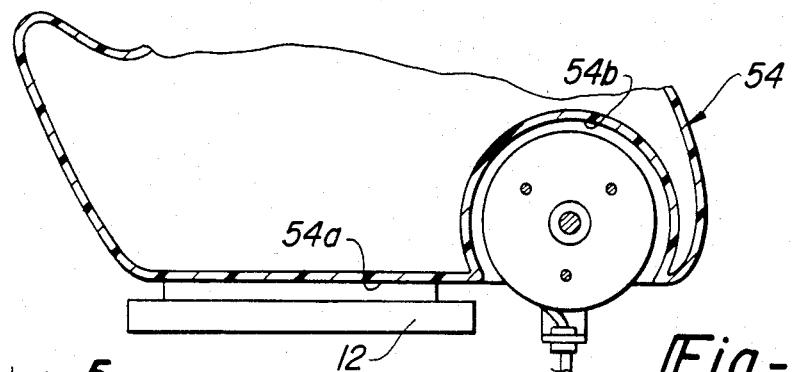
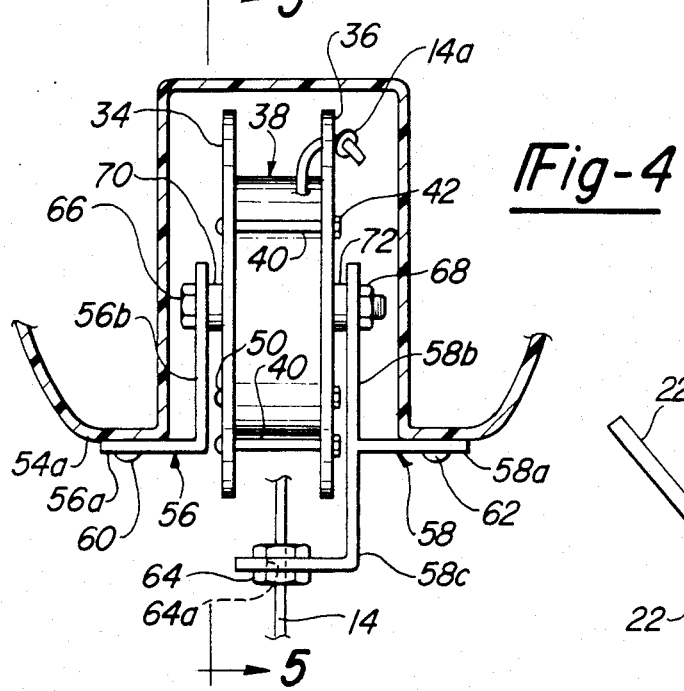
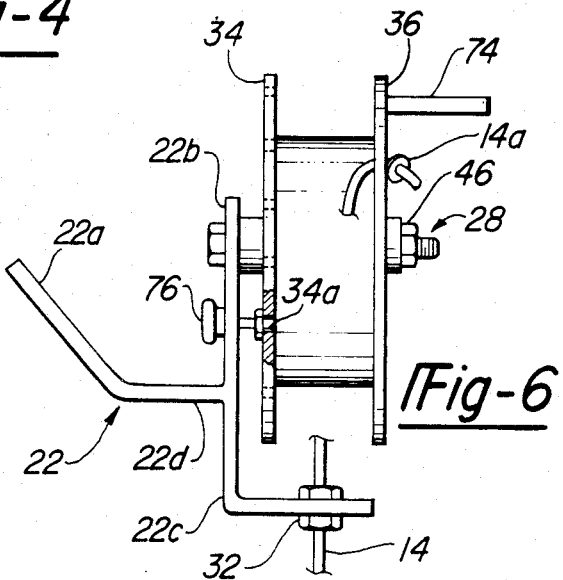
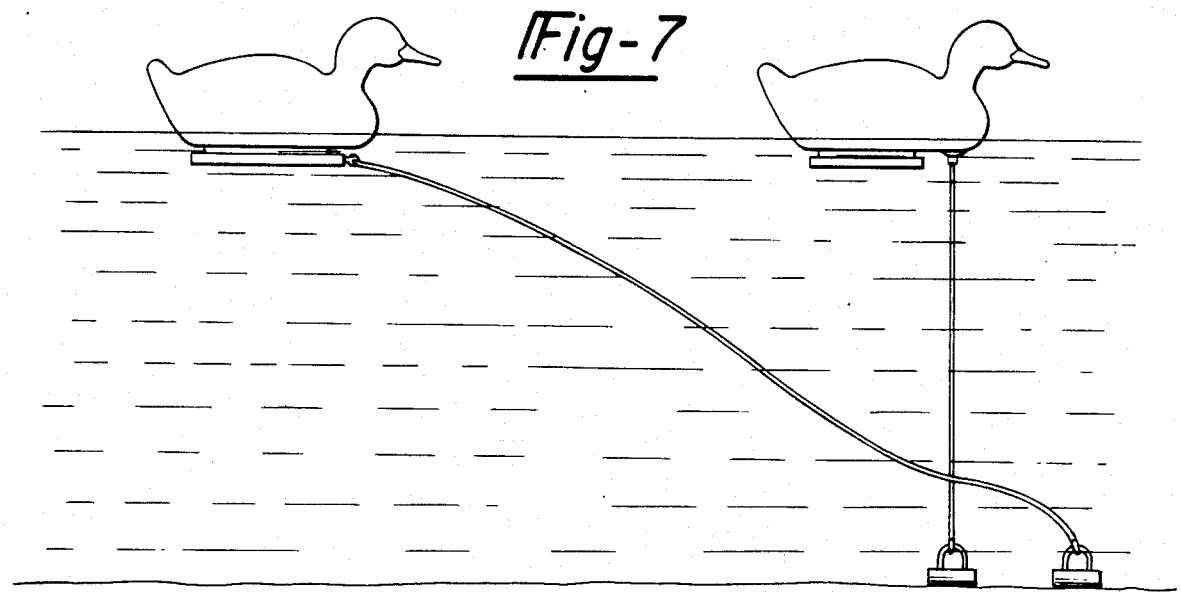

WATERFOWL DECOY

BACKGROUND OF THE INVENTION

This invention relates to waterfowl decoys and, more particularly, to an anchor assembly for use with a waterfowl decoy.

Waterfowl decoys, simulating the appearance of various waterfowl creatures, are in common use by hunters as a means of attracting the desired waterfowl to the vicinity of the hunter's blind. The decoys are typically set out in the water adjacent the blind by the hunter and are typically anchored in some manner to preclude movement of the decoys out of the vicinity of the blind. The anchoring means employed typically comprises a fixed length of line with an anchor member on one end and the line attached at its other end to the decoy, most commonly the front end of the keel portion of the decoy. Whereas these anchoring devices are generally satisfactory, they do present certain difficulties and shortcomings in their use. Specifically, since the lines are of a fixed length and the water depths vary, it is virtually impossible to provide a line corresponding exactly to the depth of the water. As a practical matter, the line typically is chosen to have a length somewhat greater than the estimated depth of the water to ensure that the anchor will engage the bottom. This excess length however allows the decoy to drift relative to the anchor so that the decoy cannot be precisely positioned. This excess length also has the disadvantage that, if several decoys are used, the drifting lines of the several decoys can easily become entangled. The drifting lines also increase the likelihood that hunters or dogs will become entangled in the lines in the process of setting up the decoys or retrieving the game. The typical anchor arrangement has the further disadvantage that, following their use, the lines must be wrapped around the decoy, most typically around the keel portion of the decoy. This wrapping operation is time consuming and unpleasant since the lines are typically cold and water soaked. The unwrapping procedure necessary to prepare the decoys for use is similarly time consuming and unpleasant. Further, the lines frequently unwind from the decoy when the decoys are handled or transported together in a sack or the like, with the result that the lines and associated anchors from different decoys become hopelessly entangled. Further, the winding of the line and anchor around the decoy can cause damage to the painted finish of the decoys.

SUMMARY OF THE INVENTION

This invention is directed to the provision of an improved anchor assembly for a waterfowl decoy.

More particularly, the invention is directed to an anchor assembly for a waterfowl decoy which will function to maintain the decoy precisely over the anchor and which will eliminate the time consuming and painstaking winding and unwinding operations associated with the prior art anchor assemblies.

The invention is further directed to the provision of a waterfowl decoy having an improved anchoring capability.

The waterfowl decoy according to the invention comprises a body portion simulating a waterfowl; an anchor; a line secured at its one end to the anchor; means operative to move the line between a stowed position in which is wound upon itself at a location adjacent the body portion to position the anchor adjacent the body portion and an operative position in which the one end of the line is payed out from the body portion to position the anchor at a position remote from the body portion. This arrangement provides a convenient means of winding and unwinding the line and associated anchor from the decoy to simplify the winding and unwinding operation, substantially reduce the time required to perform these operations, and substantially eliminates the unpleasantries associated with these operations.

According to a further feature of the invention, the operative means comprises a reel mounted adjacent the body portion for rotation about its axis; and means biasing the reel for rotation about its axis in a winding direction and operative, with the weight of the anchor tensioning the line, to allow resisted rotation of the reel in an unwinding direction to allow the line to pay out and allow the anchor to move from its stowed position and seek its remote position on the body of the associated body of water and, with the weight of the anchor disassociated from the line, to rotate the reel in the winding direction to wind the line around the reel. This arrangement allows the decoy to be set on the water by the hunter, whereafter the reel will automatically unwind to an extent to pay out sufficient line to allow the anchor to seek the bottom of the associated body of water so that the precise amount of line required, and no more, is payed out in each situation and so that the payed out line is thereafter maintained taut by the biasing means of the reel to preclude wandering of the decoy from its location directly over the anchor. This arrangement also greatly facilitates winding of the line and anchor since, once the decoy is pulled out of the water and the weight of the anchor removed from the line, the reel is operative to automatically and quickly wind the line around the reel to move the anchor to its stowed position adjacent the body portion of the decoy.

According to a further feature of the invention, the decoy further includes a fixed axle; the reel is mounted for rotation on the axle; and the biasing means comprises a strip of spring material anchored at its inner end to the axle, fixed at its outer end to the reel at a location spaced radially from the axle, and wound intermediate its ends about the axle. This arrangement provides a simple and compact mechanism for biasing the reel in a winding direction and controllably resisting the unwinding movement of the reel under the weight of the anchor.

According to a further feature of the invention, the reel includes a pair of spaced circular flange members mounted for rotation on the axle and a hollow circular hub member of smaller diameter than the flange member sandwiched between the flange member; and the spring strip is positioned within the hollow hub member and is secured at is outer end adjacent the inner periphery of the hub member. This arrangement efficiently and compactly contains the spring member and provides an effective and efficient force application assembly.

According to a further feature of the invention, the body portion includes a cavity opening in the lower face of the body portion and the reel is mounted in the cavity for rotation about a generally horizontal axis so that the line pays off of the reel and downwardly out of the lower end of the cavity to precisely and positively lower the anchor to its remote location on the bottom of the associated body of water.

The invention also provides an aftermarket anchor assembly for use with existing waterfowl decoys. The invention anchor assembly includes a bracket assembly including a mounting portion adapted to be secured to an under portion of the decoy and an axle portion rigidly connected to the mounting portion; a reel including spaced circular flange members mounted for rotation on the axle portion and a hollow hub situated between the flange members in surrounding relation to the axle portion of the bracket assembly; and a strip of spring material positioned within the hub and wound helically around the axle portion with one end thereof secured to the axle portion and the other end thereof secured to the reel adjacent the hub member. The invention anchor assembly may thus be readily mounted to an existing waterfowl to provide a ready and convenient means of paying out the line and associated anchor in a precise and positive manner and in a manner that will ensure that only the necessary amount of line is payed out so that the decoy will remain over the anchor location.

According to a further feature of the invention, the bracket assembly further includes a line guide portion presenting a guide aperture at a location spaced radially outwardly from the hub member for sliding and guiding passage of the line paying off of the hub member. The mounting bracket portion is adapted to be secured to a side face of the keel of the decoy and the bracket assembly is configured such that the guide aperture lies on the approximate vertical centerline of the decoy with the bracket mounting portion secured to the side face of the keel. This construction ensures that the line will pay out along the vertical centerline of the decoy so that the force applied to the decoy from the tensioned line is applied centrally of the decoy to stabilize the decoy in the water.

BRIEF DESCRIPTION OF THE DRAWINGS

FIG. 4 is a fragmentary view of a waterfowl decoy employing an anchor assembly according to the invention;

FIG. 5 is a cross sectional view taken on line 5—5 of FIG. 4;

FIG. 6 is a view of a further embodiment of the anchor assembly of the invention;

FIG. 7 is a view showing the use of the invention anchor assembly in an associated body of water.

DETAILED DESCRIPTION OF THE PREFERRED EMBODIMENT

Figure 1:
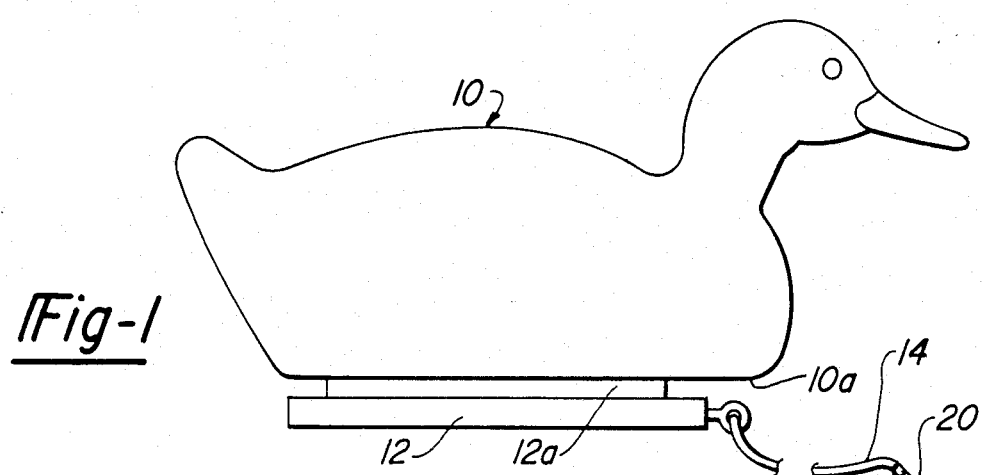
FIG. 1 is a view of a typical waterfowl decoy employing a typical prior art anchoring assembly.

The prior art waterfowl decoy seen in FIG. 1 simulates a duck and includes a body portion 10 and a keel 12 projecting downwardly from the lower face 10a of the body portion and including a recessed or indented portion 12a. FIG. 1 also illustrates a conventional anchor assembly typically used with a waterfowl decoy and including a line 14 suitably secured to the front end of the keel 12 and an anchor 16. Anchor 16 is typically formed of lead and includes a handle or loop portion 18 secured to the free end of line 14 as by a clip 20.

In the use of the decoy of FIG. 1 and the anchor assembly of FIG. 1, the decoy is set upon the water in the vicinity of the hunter's blind and the anchor is allowed to settle to the bottom of the water. Since it is impossible to precisely match the length of line 14 with the depth of the water, the decoy will typically drift from the location of the anchor as seen in FIG. 7. When it is desired to retrieve the decoy, the decoy is lifted out of the water along with the line 14 and anchor 16 and the line 14 is wrapped around the recessed portion 12a of the keel and the loop 18 of the anchor is passed over the head of the decoy to loop it around the neck of the decoy. When it is again desired to use the decoy, the anchor is removed from the head of the decoy and the line 14 is unwrapped from its stowed position around the recessed portion 12a of the keel.

Figure 2:
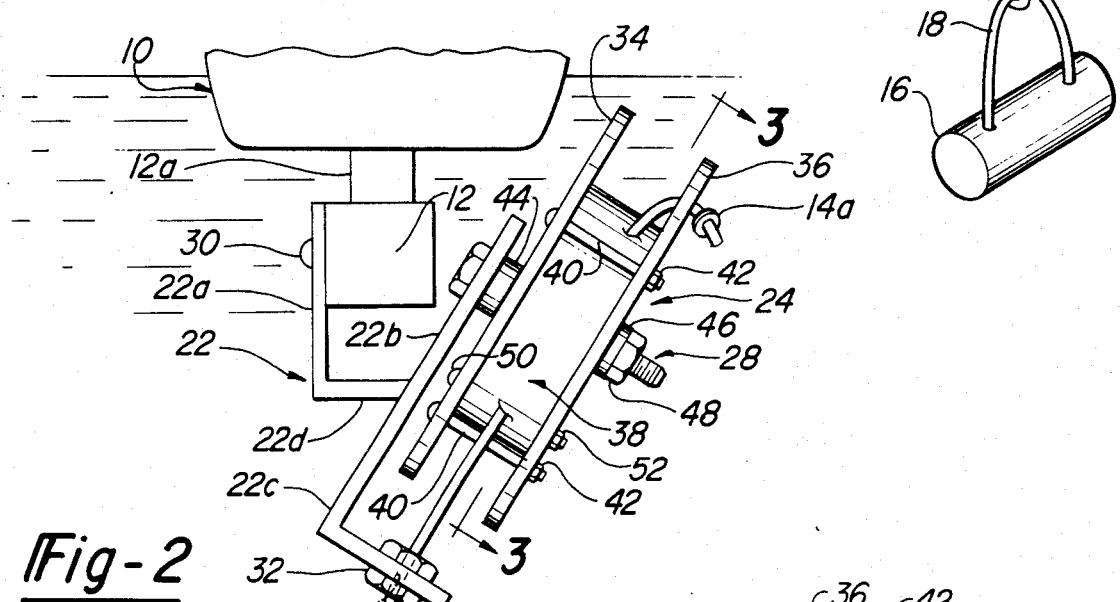
FIG. 2 is a fragmentary view showing an anchor assembly according to the invention attached to a typical waterfowl decoy.
Figure 3:
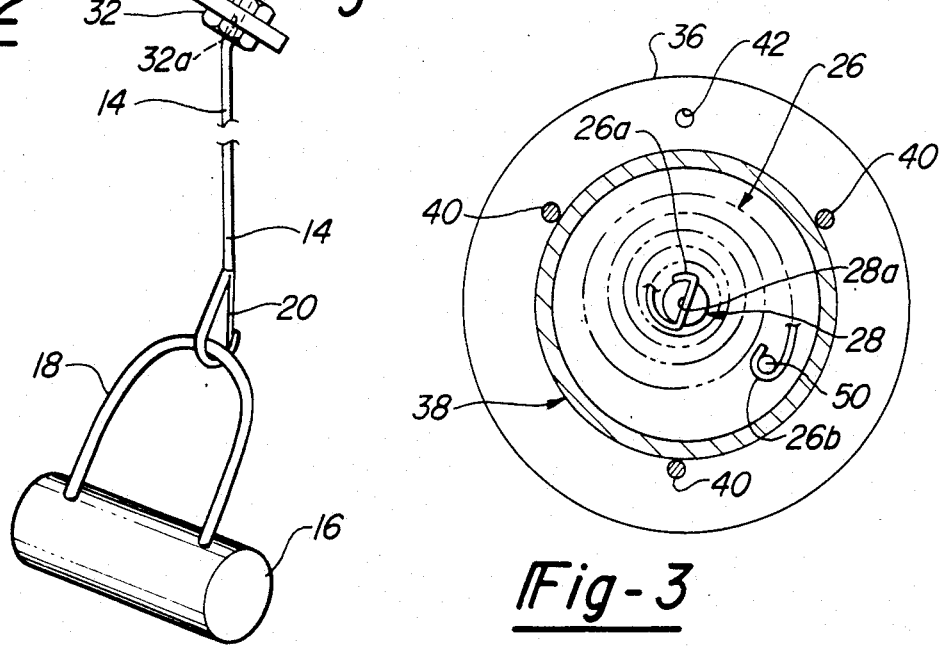
FIG. 3 is a cross sectional view taken on line 3—3 of FIG. 2.

An anchor assembly according to the invention is seen in FIGS. 2 and 3. The invention anchor assembly includes a bracket assembly 22; a reel 24; and a strip of spring material 26.

Bracket assembly 22 includes a mounting portion 22a adapted to be secured to a side face of the keel 12 of the decoy; a reel mounting portion 22b; a line guide portion 22c; a web portion 22d interconnecting portions 22a and 22b and an axle 28. Mounting portion 22a includes suitable apertures for the passage of suitable fastener means 30 to secure the bracket assembly to a side face of the keel 12. Guide portion 22c mounts a plastic bushing 32 sized to slidably pass the line 14. Axle 28 is in the form of a bolt welded to bracket portion 22b. The configuration of the bracket assembly is such that, with mounting portion 22a secured to the side face of keel 12, the guide aperture 32a presented by the bushing 32 lies substantially on the vertical centerline of the decoy.

Reel 24 includes a pair of spaced circular flange members 34, 36 rotatably mounted on bolt 28 and a central hollow hub member 38 sandwiched between flange members 34 and 36. Flange members 34 and 36 and hub member 38 are held in their assembled relation by a plurality of screw bolts 40 passing through aligned apertures in the flange members 34, 36 immediately adjacent the outer periphery of hub member 38 and coacting with nuts 42. Flange member 36 further includes an aperture 42 sized to pass line 14 so that the line may be passed outwardly through aperture 42 and knotted as seen at 14a to preclude slippage of the line 14 out of aperture 42. It will be understood that line 14, starting at its knotted end 14a, winds helically around hub member 38 and then pays downwardly off of the reel through guide aperture 32a. Reel 24 is mounted on bolt 28 by a pair of spacers or washers 44 and 46 and by a nut 48.

Strip 26 is formed of an elongated flat strip of spring steel and is mounted within hub member 38 with its inner end 26a hooked through a slot 28a in bolt 28, its outer end 26b hooked around a screw bolt 50 passing through aligned apertures in flange members 34 and 36 for coaction with a nut 52, and wound intermediate its ends helically around bolt 28. The parameters of spring strip 26 are chosen such that, with bracket assembly 22 secured to the side face of the keel 12, and given an anchor 16 of known weight, with the weight of the anchor tensioning the line 14, spring strip 26 functions to allow resisted rotation of the reel in an unwinding direction and, with the weight of the anchor disassociated from the line 14, strip 26 functions to rotate the wheel in a winding direction. With this arrangement, when the waterfowl is placed on the surface of the water adjacent the hunter's blind and the anchor 16 removed from the neck of the decoy and released, the strip 26 will function to allow the anchor to be controllably lowered to the bottom of the body of water with such lowering movement being allowed by, but resisted by, spring strip 26. Once the anchor reaches the bottom of the water, spring strip 26 functions to preclude any further unwinding movement of the reel so that only the precise amount of line 14 required to allow the anchor to reach the bottom is payed out from the reel and so that the payed out line is maintained under tension. The decoy will thus maintain a position directly over the anchor even in the presense of winds or choppy water.

When the decoy is later removed from the water and the anchor is grasped by the hunter to disassociate the weight of the anchor from the line, spring strip 26 functions to wind the reel 24 in a winding direction so that the line is quickly and automatically wound around the reel until the anchor reaches the vicinity of the reel whereafter the loop 18 of the anchor is passed over the head of the decoy to its stowed position looped around the neck of the decoy. In the stowed position of the anchor member, the spring strip 26 functions to maintain the portion of the line 14 between guide aperture 32a and the anchor in a taut condition to preclude snagging with the lines of other decoys.

A decoy including a built-in anchor assembly according to the invention is seen in FIGS. 4 and 5. The body portion 54 of the decoy, as is typical, is formed of plastic and is hollow. The decoy further includes the usual keel 12 projecting downwardly from the lower face 54a of the body portion 54. A cavity 54b is provided in the body portion forwardly of keel 12 and adjacent the front end of the body portion. Cavity 54b is generally circular in cross section and opens in the lower face 54a of the body portion. A reel 24, identical to the reel described with reference to the anchor assembly of FIGS. 2 and 3, is positioned within cavity 54b by bracket members 56 and 58.

Bracket member 56 includes a mounting portion 56a secured to the adjacent undersurface 54a of the decoy as by screws 60 and an upstanding reel mounting portion 56b. Bracket member 58 includes a bracket mounting portion 58a secured to the undersurface 54b of the decoy as by screws 62, an upstanding reel mounting portion 58b, and a downwardly extending guide portion 58c mounting a bushing 64 defining a guide aperture 64a for line 14. A bolt 66 is welded to reel mounting portion 56b of bracket member 56 and extends through an aligned aperture in reel mounting portion 58b of bracket member 58 for coaction with a nut 58. Washers 70 and 72 maintain the proper spacing as between the bracket portions 56b and 58b and the flange members 34 and 36 of the reel. Flange members 34 and 36 are rotatably mounted on bolt 66 and a spring strip 26 is positioned within hub member 38, as previously described with respect to the anchoring assembly of FIGS. 2 and 3, with its inner end secured in a slot in bolt 66 and its outer end hooked around a screw bolt 50.

As with the anchoring assembly of FIGS. 2 and 3, the parameters of the steel strip 26 are chosen such that, when the anchor is released following placement of the decoy in the water, the spring strip controllably resists the downward movement of the anchor but functions as soon as the anchor hits bottom to preclude any further paying out of line so that the payed out line is maintained taut and so that the decoy remains in position over the anchor. As also described previously with reference to the anchor assembly of FIGS. 2 and 3, when, following removal of the decoy from the water, the anchor is grasped by the hunter to disassociate the weight of the anchor from the line 14, spring strip 26 functions to rotate the reel in a winding direction to quickly and positively wind line 14 on the reel until the anchor is adjacent the decoy whereafter loop 18 is passed over the head of the decoy to complete the stowage operation.

A modification of the invention anchor assembly is seen in FIG. 6. In this modification, which may be used as a separate after market anchor assembly or as a built-in anchor mechanism in a total decoy assembly, the spring steel strip is eliminated and a hand crank 74 is provided in a radially outer location on the outer face of flange member 36 to allow reel to be hand cranked to wind and unwind the line 14. A lock button 76 is provided in reel mounting portion 22b of flange assembly 22 for coaction with a plurality of holes 34a provided at circumferentially spaced locations around flange member 34. In the use of the anchor mechanism of FIG. 6, button 76 is withdrawn from engagement with flange member 34 and crank 74 is utilized to wind or unwind the reel to pay out or wind up line 14 to the desired extent, whereafter button 76 is pushed into engagement with the closest adjacent hole 34a to lock the reel in its adjusted position.

The invention will be seen to provide an anchor mechanism for a waterfowl decoy which avoids all of the problems and shortcomings of the prior art anchor assemblies. Specifically, the invention anchor assembly pays only so much of the line as is required to allow the anchor to position itself on the bottom of the associated body of water whereafter the anchoring mechanism functions to maintain the payed out line taut so that the decoy is maintained in position directly over the anchor. This feature, as seen in FIG. 7, has the advantage of precisely and positively positioning the decoy in the exact spot desired and has the further advantage of precluding drifting of the decoy to create laterally extending sections of line which can become readily entangled with the lines of adjacent decoys and which can be readily entangled by hunters and dogs seeking to reach the decoy or to reach game.

The invention anchor mechanism further functions to quickly and positively wind the line onto the reel as soon as the weight of the anchor is disassociated from the line so as to totally avoid the unpleasantries associated with handling the wet and cold line in both the winding and unwinding mode. The invention anchor mechanism also provides positive storage of the line and anchor so that the lines are precluded from unwinding during handling or transportation of the decoy, resulting in tangling with the lines of adjacent decoys. The invention anchor mechanism further functions to avoid damage to the painted finish of the decoys since the line is neatly and positively stowed within or adjacent to the body of the decoy.

Although preferred embodiments of the invention have been illustrated and described in detail, it will be apparent that various changes may be made in the disclosed embodiment without departing from the scope or spirit of the invention.

We claim:

1. A waterfowl decoy comprising:
   (A) a body portion simulating a waterfowl;
   (B) a rigid, generally horizontal axle secured to the underside of said body portion;
   (C) a reel including a pair of spaced circular flange members mounted for rotation on said axial and a central hub member sandwiched between said flange members;

(D) a cord attached at one end to said reel and wound on said central hub member of said reel;

(E) an anchor secured to the other end of said cord; and (F) means operative
  (1) with the weight of said anchor tensioning said cord, to allow said reel to rotate on said axle in an unwinding direction and allow said cord to pay out freely from said reel, whereby when the decoy is placed on a body of water the anchor will move freely downwardly in the water from a stowed position adjacent said reel and seek a remote position on the bottom of the body of water,
  (2) with said anchor resting on the bottom of the associated body of water, to maintain an upward pull on said cord so that the decoy can rise and fall with changing water levels and said anchor will remain directly beneath the decoy and on the bottom of the body of water, and
  (3) with the weight of said anchor disassociated from said cord, to rotate said reel in a winding direction to wind said cord around said central hub, whereby when the decoy is removed from the water and the weight of the anchor removed from the cord, the cord will be automatically wound to its fully stowed position on said reel.

2. A decoy according to claim 1 wherein:
(G) said operative means includes a strip of spring steel anchored at its inner end to said axle, fixed at its outer end to said reel at a location spaced radially from said axle, and wound intermediate its ends about said axle.

3. A decoy according to claim 2 wherein:
(H) said circular hub member is hollow; and
(I) said spring steel strip is positioned within said hollow hub member and is secured at its outer end adjacent the inner periphery of said hub member.

4. A decoy according to claim 1 wherein:
(G) said body portion includes a cavity opening in the lower face of said body portion; and
(H) said reel is mounted in said cavity on said axle for rotation about a generally horizontal axis so that said line pays off of said reel and downwardly out of the lower end of said cavity.

5. A decoy according to claim 4 wherein:
(I) said decoy further includes a keel projecting downwardly from the lower face of said body portion; and
(J) said cavity is defined forwardly of said keel adjacent the forward end of said body portion.

6. A decoy according to claim 4 wherein:
(I) said cavity is centered on the vertical center line of said decoy; and
(J) said decoy further includes means presenting a guide aperture at a location below said reel and lying generally on the vertical centerline of said decoy.

7. An anchor assembly for use with a waterfowl decoy, said assembly comprising:
(A) bracket means adapted to be rigidly secured to the underside of the decoy and including a rigid, generally horizontal axle;

(B) a reel including a pair of spaced circular flange members mounted for rotation on said axle and a central hub member sandwiched between said flange members;

(C) a cord attached at one end to said reel and wound on said central hub member of said reel;

(D) an anchor secured to the other end of said cord; and (E) means operative
  (1) with the weight of said anchor tensioning said cord, to allow said reel to rotate on said axle in an unwinding direction and allow said cord to pay out freely from said reel, whereby when the decoy is placed on body of water the anchor will move freely downwardly in the water from a stowed position adjacent said reel and seek a remote position on the bottom of the body of water,
  (2) with said anchor resting on the bottom of the associated body of water, to maintain an upward pull on said cord so that the decoy can rise and fall with changing water levels and the anchor will remain directly beneath the decoy and on the bottom of the body of water, and
  (3) with the weight of said anchor disassociated from said cord, to rotate said reel in a winding direction to wind said cord around said central hub, whereby when the decoy is removed from the water and the weight of the anchor is removed from the cord, the cord will be automatically wound to its fully stowed position on said reel.

8. An anchor assembly according to claim 7 and further including:
(D) an anchor; and
(E) a line attached at its one end to said reel and at its other end to said anchor.

9. An anchor assembly according to claim 7 wherein:
(D) said bracket assembly further includes a line guide portion presenting a guide aperture at a location spaced radially outwardly from said hub member for slidable and guidable passage of a line paying off of said hub.

10. An anchor assembly accoring to claim 9 wherein:
(E) said bracket mounting portion is adapted to be secured to a side face of a keel projecting downwardly from the underside of said decoy; and
(F) said bracket assembly is configured such that said guide aperture lies on the approximate vertical centerline of the decoy with said bracket mounting portion secured to the side face of the keel.

11. An anchor assembly according to claim 7 wherein:
(F) said operative means includes a strip of spring steel anchored at its inner end to said axle, fixed at its outer end to said reel at a location spaced radially from said axle, and wound intermediate its ends about said axle.

12. A anchor assembly according to claim 11 wherein:
(G) said circular hub member is hollow; and
(H) said spring steel strip is positioned within said hollow hub member and is secured at its outer end adjacent the inner periphery of said hub member.

* * * * *